United States Patent
Greiner et al.

(10) Patent No.: US 8,412,421 B2
(45) Date of Patent: Apr. 2, 2013

(54) SYSTEMS AND METHODS FOR IMPROVING HAUL ROUTE MANAGEMENT

(75) Inventors: Jonny Greiner, Dunlap, IL (US); Yang Liu, Peoria, IL (US); Bhavin Vyas, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/316,926

(22) Filed: Dec. 12, 2011

(65) Prior Publication Data

US 2012/0083969 A1 Apr. 5, 2012

Related U.S. Application Data

(62) Division of application No. 11/897,651, filed on Aug. 31, 2007, now Pat. No. 8,095,279.

(51) Int. Cl.
*G06F 7/70* (2006.01)
*G06F 19/00* (2006.01)
*B60Q 1/00* (2006.01)
*B60Q 1/52* (2006.01)

(52) U.S. Cl. ........... 701/50; 701/117; 340/439; 340/471

(58) Field of Classification Search .............. 701/50, 701/80–97, 110, 114, 117; 37/205–223, 37/233, 236, 240, 242, 244, 246–252, 264, 37/266, 271, 305; 56/10.1, 10.2 R, 10.3–10.4, 56/10.2 A–10.2 H, 10.2 J, 10.5–17.6
See application file for complete search history.

(56) References Cited

U.S. PATENT DOCUMENTS 5,646,844 A * 7/1997 Gudat et al. ............... 701/409
8,014,924 B2 9/2011 Greiner et al.
2002/0010569 A1 1/2002 Yamamoto
2004/0122580 A1 * 6/2004 Sorrells ..................... 701/80
2006/0047384 A1 * 3/2006 Robinson et al. ........... 701/35
2007/0156325 A1 * 7/2007 Livshiz et al. .............. 701/123
2009/0006734 A1 * 1/2009 Kishi et al. ................ 711/111

OTHER PUBLICATIONS

Jonny Ray Greiner et al., Co-Pending U.S. Appl. No. 11/897,736, filed Aug. 31, 2007.
Jonny Ray Greiner et al., Co-Pending U.S. Appl. No. 11/974,371, filed Oct. 12, 2007.
Jonny Ray Greiner et al., Co-Pending U.S. Appl. No. 12/002,040, filed Dec. 14, 2007.

* cited by examiner

*Primary Examiner* — James Trammell
*Assistant Examiner* — Muhammad Shafi
(74) *Attorney, Agent, or Firm* — Finnegan, Henderson, Farabow, Garrett & Dunner LLP

(57) ABSTRACT

A method for managing haul routes in work environments comprises receiving performance criteria associated with a haul route and establishing a target total effective grade for at least one machine associated with the haul route based on the performance criteria. The method also includes collecting performance data associated with the at least one machine. A drive axle torque of the at least one machine is determined and an actual total effective grade associated with the at least one machine is estimated. The at least one machine is identified as an underperforming machine if the actual total effective grade for the at least one machine exceeds the target total effective grade. An average total effective grade for the at least one machine is determined as a function of the actual total effective grade. A haul route deficiency is identified if the average total effective grade exceeds a threshold level.

5 Claims, 4 Drawing Sheets

SYSTEMS AND METHODS FOR IMPROVING HAUL ROUTE MANAGEMENT

RELATED APPLICATION

This application is a divisional of U.S. application Ser. No. 11/897,651 filed Aug. 31, 2007, now pending, which is hereby fully incorporated by reference.

TECHNICAL FIELD

The present disclosure relates generally to systems and methods for enhancing machine productivity in work environments and, more particularly, to a method for adjusting haul route characteristics and/or machine operating parameters in work environments based on customer-defined operational criteria.

BACKGROUND

In many work environments, particularly those that employ a fleet of machines that cooperate to perform a common task, productivity, efficiency, and profitability of the work environment may be dependent upon a variety of interrelated factors. For example, in mine environments that employ heavy equipment to excavate and transport materials from a mine site to a production facility, the productivity of the mine is directly dependent upon the health and productivity of each machine in the fleet. For some machines, such as transport vehicles and haulers, productivity may also depend upon work environment conditions (e.g., terrain conditions, weather conditions, etc.), as these conditions often affect speed, handling, and traction of the machines.

In some work environments, external conditions may have a significant impact on the profitability of the work environment. For example, some countries impose restrictions on the amount of greenhouse gas that certain types of work sites can emit. Consequently, excessive greenhouse gas emissions may result in fines or other penalties that may significantly reduce the profitability of the work site. In these types of environments, it may be advantageous to control or enhance certain work environment features (e.g., terrain, route distance, etc.), so as to limit the greenhouse gas emissions in these environment. Thus, in order to increase work environment productivity, a method for monitoring and adjusting work environment operating features based on desired work environment operating goals may be required.

One conventional method for adjusting certain work environment operating features is described in U.S. Pat. No. 5,817,936 ("the '936 patent") to Schricker. The '936 patent describes a method for detecting a change in the condition of a road by sensing a plurality of parameters from one or more machines traveling along the road. The sensed parameters may be used to calculate a resistance factor for each of the one or more machines and determining an average resistance factor for the fleet of machines. If the average resistance factor exceeds a threshold level, a change (i.e., deficiency or fault) in the road segment may be identified and/or corrected.

Although some conventional methods, such as the method described in the '936 patent, may enable detection of changes in road conditions based on performance of a fleet of machines, they may be limited in certain situations. For example, road conditions constitute only one aspect of work environment productivity. Thus, the method described in the '936 patent may be limited to enhancing work environment productivity by correcting deficiencies in the road conditions. However, the method of the '936 patent may not effectively identify and correct other deficiencies in work environment operations (e.g., excessive fuel consumption, traffic congestion, inefficient or underperforming machines, etc.)

Moreover, many conventional methods for enhancing haul route management, like the one described in the '936 patent, are configured to identify and correct a particular work environment problem. In many situations, however, enhancing productivity of the work environment often involves identifying and improving several work environment features and parameters (e.g., haul route design, performance of one or more machines, traffic, etc.) Moreover, different work environments often require different productivity goals, as well as different cost factors. Thus, in order to effectively improve work environment productivity while controlling costs associated with achieving work environment goals, a system and method for identifying problems associated with a plurality of work environment operations, determining how each work environment parameter impacts each problem, and making the appropriate work environment enhancements to achieve the goals in a cost-effective manner, may be required.

The presently disclosed systems and methods for improving haul route management is directed toward overcoming one or more of the problems set forth above.

SUMMARY OF THE INVENTION

In accordance with one aspect, the present disclosure is directed toward a method for improving haul route management. The method may include receiving performance criteria associated with a haul route and establishing a target total effective grade for at least one machine associated with the haul route based on the performance criteria. Performance data associated with the at least one machine may be collected. A drive axle torque of the at least one machine may be determined based on the performance data and an actual total effective grade associated with the at least one machine may be estimated based on the drive axle torque. The at least one machine may be identified as an underperforming machine if the actual total effective grade for the at least one machine exceeds the target total effective grade. An average total effective grade for the at least one machine may be monitored, and potential haul route deficiency may be identified if the average total effective grade exceeds a threshold level.

According to another aspect, the present disclosure is directed toward a method for improving haul route management. The method may include receiving performance criteria associated with a haul route. The method may also include collecting performance data associated with a plurality of machines operating on the haul route. The method may further include determining, based on the collected performance data, whether actual performance of the haul route is consistent with the performance criteria. If the actual performance is inconsistent with performance criteria, a design performance of each machine may be simulated. The collected performance data may be compared with simulated design performance data and one or more underperforming machines may be identified based on the comparison. A potential problem with the haul route may be identified if a total number of underperforming machines exceeds a threshold number. The method may also include generating a performance report providing one or more recommendations for improving haul route management.

In accordance with yet another aspect, the present disclosure is directed toward a haul route management system. The system may include a condition monitoring system in data communication with at least one machine operating in a work environment and configured to collect performance data associated with the at least one machine. The system may also include a torque estimator communicatively coupled to the condition monitoring system. The torque estimator may be configured to determine a drive axle torque of the at least one machine and estimate a total effective grade associated with the at least one machine based on the drive axle torque. The system may further include a performance simulator communicatively coupled to the torque estimator and the condition monitoring system. The performance simulator may be configured to establish a target total effective grade for the at least one machine based on the performance criteria. The performance simulator may also be configured to collect performance data associated with the at least one machine and monitor an average total effective grade for the at least one machine. The performance simulator may also be configured to identify a potential haul route deficiency if the average total effective grade exceeds a threshold level.

DETAILED DESCRIPTION

Figure 1:
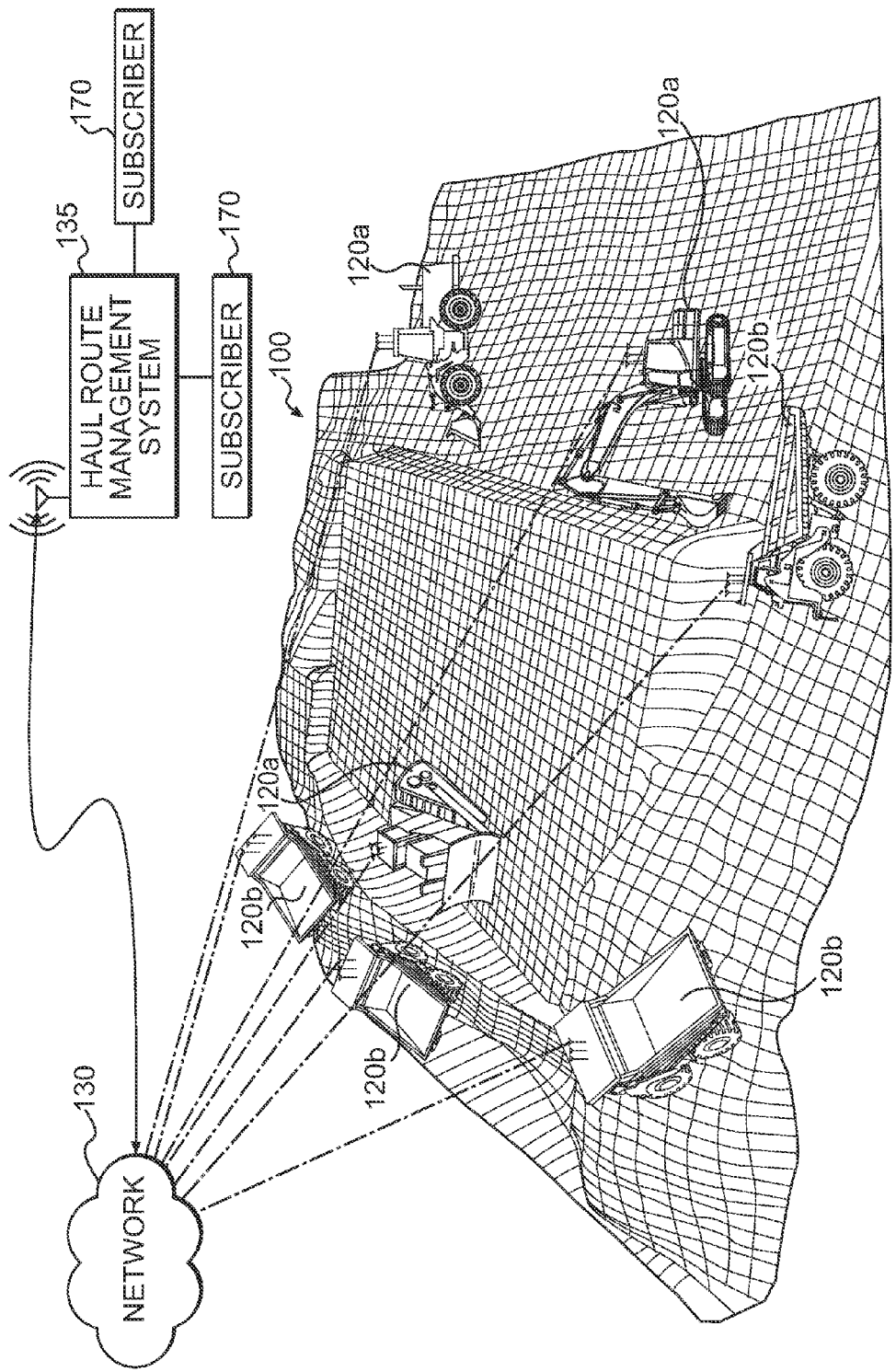
FIG. 1 illustrates an exemplary work environment consistent with the disclosed embodiments.

FIG. 1 illustrates an exemplary work environment 100 consistent with the disclosed embodiments. Work environment 100 may include systems and devices that cooperate to perform a commercial or industrial task, such as mining, construction, energy exploration and/or generation, manufacturing, transportation, agriculture, or any task associated with other types of industries. According to the exemplary embodiment illustrated in FIG. 1, work environment 100 may include a mining environment that comprises one or more machines 120a, 120b coupled to a haul route management system 135 via a communication network 130. Work environment 100 may be configured to monitor, collect, and filter information associated with the status, health, and performance of one or more machines 120a, 120b, and distribute the information to one or more back-end systems or entities, such as haul route management system 135 and/or subscribers 170. It is contemplated that additional and/or different components than those listed above may be included in work environment 100.

As illustrated in FIG. 1, machines 120a, 120b may include one or more excavators 120a and one or more transport machines 120b. Excavators 120a may embody any machine that is configured to remove material from the mine and load the material onto one or more transport machines 120b. Non-limiting examples of excavators 120a include, for example, bucket-type excavating machines, electromagnetic-lift devices, backhoe loaders, dozers, etc. Transport machines 120b may embody any machine that is configured to transport materials within work environment 100 such as, for example, articulated trucks, dump trucks, or any other truck adapted to transport materials. The number, sizes, and types of machines illustrated in FIG. 1 are exemplary only and not intended to be limiting. Accordingly, it is contemplated that work environment 100 may include additional, fewer, and/or different components than those listed above. For example, work environment 100 may include a skid-steer loader, a track-type tractor, material transfer vehicle, or any other suitable fixed or mobile machine that may contribute to the operation of work environment 100.

Figure 2:
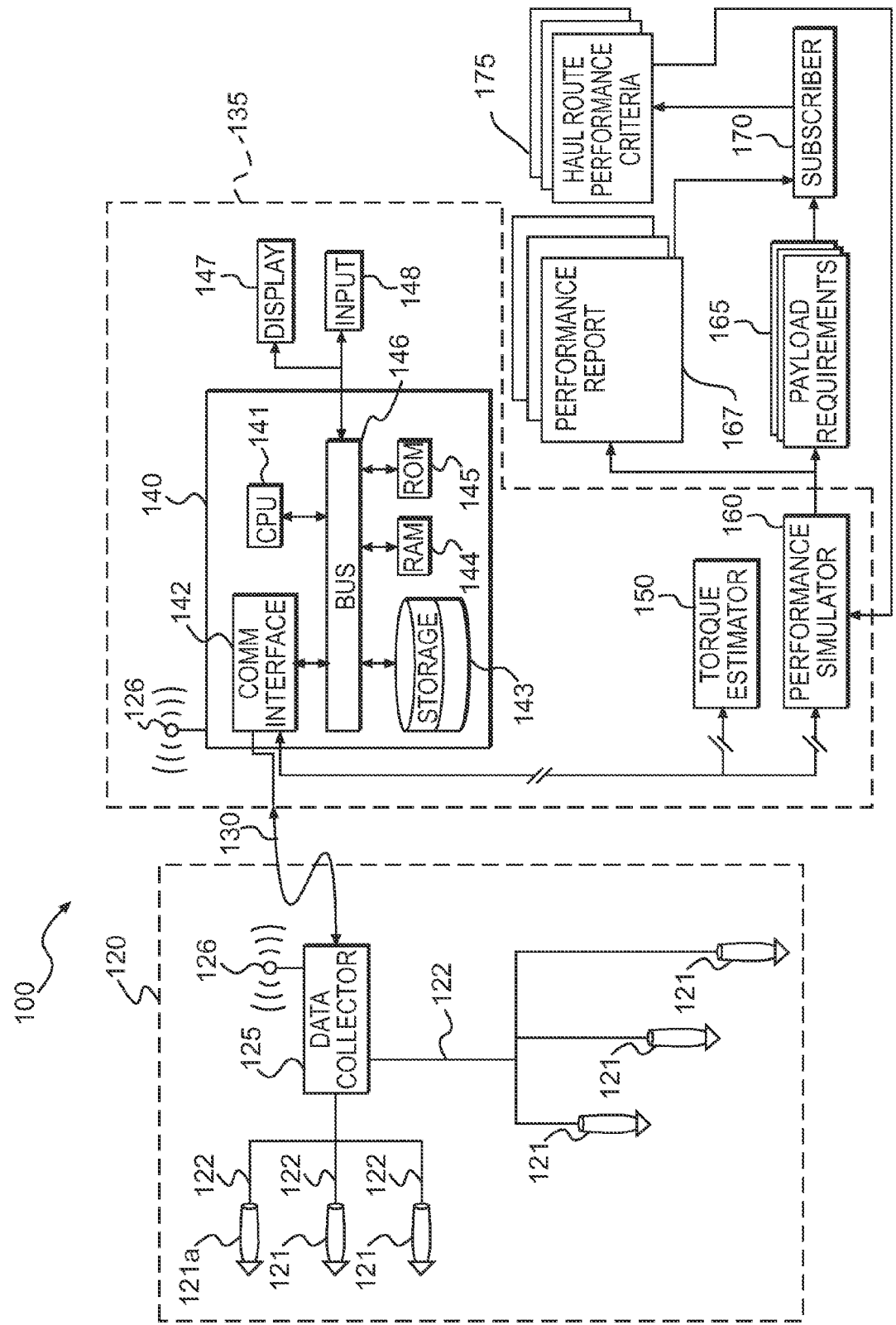
FIG. 2 provides a schematic diagram illustrating certain components associated with the work environment of FIG. 1.

In one embodiment, each of machines 120a, 120b may include on-board data collection and communication equipment to monitor, collect, and/or distribute information associated with one or more components of machines 120a, 120b. As shown in FIG. 2, machines 120a, 120b may each include, among other things, one or more monitoring devices 121, such as sensors, electronic control modules, etc. (not shown) coupled to one or more data collectors 125 via communication lines 122; one or more transceiver devices 126; and/or any other components for monitoring, collecting, and communicating information associated with the operation of machines 120a, 120b. Each of machines 120a, 120b may also be configured to receive information, warning signals, operator instructions, or other messages or commands from off-board systems, such as a haul route management system 135. The components described above are exemplary and not intended to be limiting. Accordingly, the disclosed embodiments contemplate each of machines 120a, 120b including additional and/or different components than those listed above.

Monitoring devices 121 may include any device for collecting performance data associated with one or more machines 120a, 120b. For example, monitoring devices 121 may include one or more sensors for measuring an operational parameter such as engine and/or machine speed and/or location; fluid pressure, flow rate, temperature, contamination level, and or viscosity of a fluid; electric current and/or voltage levels; fluid (i.e., fuel, oil, etc.) consumption rates; loading levels (i.e., payload value, percent of maximum payload limit, payload history, payload distribution, etc.); transmission output ratio, slip, etc.; grade; traction data; drive axle torque; intervals between scheduled or performed maintenance and/or repair operations; and any other operational parameter of machines 120a, 120b. In one embodiment, transport machines 120b may each include at least one torque sensor 121a for monitoring a torque applied to the drive axle. Alternatively, torque sensor 121a may be configured to monitor a parameter from which torque on the drive axle may be calculated or derived. It is contemplated that one or more monitoring devices 121 may be configured to monitor certain environmental features associated with work environment 100. For example, one or more machines 120a, 120b may include an inclinometer for measuring an actual grade associated with a surface upon which the machine is traveling.

Data collector 125 may be configured to receive, collect, package, and/or distribute performance data collected by monitoring devices 121. Performance data, as the term is used herein, refers to any type of data indicative of at least one operational aspect associated with one or more machines 120 or any of its constituent components or subsystems. Non-limiting examples of performance data may include, for example, health information such as fuel level, oil pressure, engine temperature, coolant flow rate, coolant temperature, tire pressure, or any other data indicative of the health of one or more components or subsystems of machines 120a, 120b. Alternatively and/or additionally, performance data may include status information such as engine power status (e.g., engine running, idle, off), engine hours, engine speed, machine speed, machine location and speed, current gear that the machine is operating in, or any other data indicative of a status of machine 120. Optionally, performance data may also include certain productivity information such as task progress information, load vs. capacity ratio, shift duration, haul statistics (weight, payload, etc.), fuel efficiency, or any other data indicative of a productivity of machine 120. Alternatively and/or additionally, performance data may include control signals for controlling one or more aspects or components of machines 120a, 120b. Data collector 125 may receive performance data from one or more monitoring devices via communication lines 122 during operations of the machine. According to one embodiment, data collector 125 may automatically transmit the received data to haul route management system 135 via communication network 130. Alternatively or additionally, data collector 125 may store the received data in memory for a predetermined time period, for later transmission to haul route management system 135. For example, if a communication channel between the machine and haul route management system 135 becomes temporarily unavailable, the performance data may be retrieved for subsequent transmission when the communication channel has been restored.

Communication network 130 may include any network that provides two-way communication between machines 120a, 120b and an off-board system, such as haul route management system 135. For example, communication network 130 may communicatively couple machines 120a, 120b to haul route management system 135 across a wireless networking platform such as, for example, a satellite communication system. Alternatively and/or additionally, communication network 130 may include one or more broadband communication platforms appropriate for communicatively coupling one or more machines 120a, 120b to haul route management system 135 such as, for example, cellular, Bluetooth, microwave, point-to-point wireless, point-to-multipoint wireless, multipoint-to-multipoint wireless, or any other appropriate communication platform for networking a number of components. Although communication network 130 is illustrated as a satellite wireless communication network, it is contemplated that communication network 130 may include wireline networks such as, for example, Ethernet, fiber optic, waveguide, or any other type of wired communication network.

Haul route management system 135 may include one or more hardware components and/or software applications that cooperate to improve performance of a haul route by monitoring, analyzing, and/or controlling performance or operation of one or more individual machines. Haul route management system 135 may include a condition monitoring system 140 for collecting, distributing, analyzing, and/or otherwise managing performance data collected from machines 120a, 120b. Haul route management system 135 may also include a torque estimator 150 for determining a drive axle torque, estimating a total effective grade, calculating a rolling resistance, and/or determining other appropriate characteristics that may be indicative of the performance of a machine or machine drive train. Haul route management system 135 may also include a performance simulator 160 for simulating performance models of slow machines and adjusting payload of slow machines in order to maintain a desired speed of the haul route.

Condition monitoring system 140 may include any computing system configured to receive, analyze, transmit, and/or distribute performance data associated with machines 120a, 120b. Condition monitoring system 140 may be communicatively coupled to one or more machines 120 via communication network 130. Condition monitoring system 140 may embody a centralized server and/or database adapted to collect and disseminate performance data associated with each of machines 120a, 120b. Once collected, condition monitoring system 140 may categorize and/or filter the performance data according to data type, priority, etc. In the case of critical or high-priority data, condition monitoring system 140 may be configured to transmit "emergency" or "critical" messages to one or more work site personnel (e.g., repair technician, project managers, etc.) indicating that a remote asset has experienced a critical event. For example, should a machine become disabled, enter an unauthorized work area, or experience a critical engine operation condition, condition monitoring system 140 may transmit a message (text message, email, page, etc.) to a project manager, job-site foreman, shift manager, machine operator, and/or repair technician, indicating a potential problem with the machine.

Condition monitoring system 140 may include hardware and/or software components that perform processes consistent with certain disclosed embodiments. For example, as illustrated in FIG. 2, condition monitoring system 140 may include one or more transceiver devices 126, a central processing unit (CPU) 141, a communication interface 142, one or more computer-readable memory devices, including storage device 143, a random access memory (RAM) module 144, and a read-only memory (ROM) module 145, a display unit 147, and/or an input device 148. The components described above are exemplary and not intended to be limiting. Furthermore, it is contemplated that condition monitoring system 140 may include alternative and/or additional components than those listed above.

CPU 141 may be one or more processors that execute instructions and process data to perform one or more processes consistent with certain disclosed embodiments. For instance, CPU 141 may execute software that enables condition monitoring system 140 to request and/or receive performance data from data collector 125 of machines 120a, 120b. CPU 141 may also execute software that stores collected performance data in storage device 143. In addition, CPU 141 may execute software that enables condition monitoring system 140 to analyze performance data collected from one or more machines 120a, 120b, modify one or more production aspects of the machine (e.g., production schedule, product release date, production budget, etc.), improve a component parameter based on one or more predefined specifications associated with the component, and/or provide customized operation analysis reports, including recommendations for component adjustment and/or design.

CPU 141 may be connected to a common information bus 146 that may be configured to provide a communication medium between one or more components associated with condition monitoring system 140. For example, common information bus 146 may include one or more components for communicating information to a plurality of devices. CPU 141 may execute sequences of computer program instructions stored in computer-readable medium devices such as, for example, a storage device 143, RAM 144, and/or ROM 145 to perform methods consistent with certain disclosed embodiments, as will be described below.

Communication interface 142 may include one or more elements configured for two-way data communication between condition monitoring system 140 and remote systems (e.g., machines 120a, 120b) via transceiver device 126. For example, communication interface 142 may include one or more modulators, demodulators, multiplexers, demultiplexers, network communication devices, wireless devices, antennas, modems, or any other devices configured to support a two-way communication interface between condition monitoring system 140 and remote systems or components.

One or more computer-readable medium devices may include storage devices 143, a RAM 144, ROM 145, and/or any other magnetic, electronic, flash, or optical data computer-readable medium devices configured to store information, instructions, and/or program code used by CPU 141 of condition monitoring system 140. Storage devices 143 may include magnetic hard-drives, optical disc drives, floppy drives, flash drives, or any other such information storing device. A random access memory (RAM) device 144 may include any dynamic storage device for storing information and instructions by CPU 141. RAM 144 also may be used for storing temporary variables or other intermediate information during execution of instructions to be executed by CPU 141. During operation, some or all portions of an operating system (not shown) may be loaded into RAM 144. In addition, a read only memory (ROM) device 145 may include any static storage device for storing information and instructions by CPU 141.

Condition monitoring system 140 may be configured to analyze performance data associated with each of machines 120a, 120b. According to one embodiment, condition monitoring system 140 may include diagnostic software for analyzing performance data associated with one or more machines 120a, 120b based on threshold levels (which may be factory set, manufacturer recommended, and/or user configured) associated with a respective machine. For example, diagnostic software associated with condition monitoring system 140 may compare an engine temperature measurement received from a particular machine with a predetermined threshold engine temperature. If the measured engine temperature exceeds the threshold temperature, condition monitoring system 140 may generate an alarm and notify one or more of the machine operator, job-site manager, repair technician, dispatcher, or any other appropriate entity.

In accordance with another embodiment, condition monitoring system 140 may be configured to monitor and analyze productivity associated with one or more of machines 120a, 120b. For example, condition monitoring system 140 may include productivity software for analyzing performance data associated with one or more machines 120a, 120b based on user-defined productivity thresholds associated with a respective machine. Productivity software may be configured to monitor the productivity level associated with each of machines 120a, 120b and generate a productivity report for a project manager, a machine operator, a repair technician, or any other entity that may subscribe to operator or machine productivity data (e.g., a human resources department, an operator training and certification division, etc.) According to one exemplary embodiment, productivity software may compare a productivity level associated with a machine (e.g., amount of material moved by a particular machine) with a predetermined productivity quota established for the respective machine. If the productivity level is less than the predetermined quota, a productivity notification may be generated and provided to the machine operator and/or project manager, indicating the productivity drop of the machine.

Condition monitoring system 140 may be in data communication with one or more other back-end systems and may be configured to distribute certain performance data to these systems for further analysis. For example, condition monitoring system 140 may be communicatively coupled to a torque estimator 150 and may be configured to provide performance data associated with the machine drive axle to torque estimator 150. Alternatively or additionally, condition monitoring system 140 may be in data communication with a performance simulator 160 and may be configured to provide performance data to performance simulator 160 for further analysis. Although torque estimator 150 and performance simulator 160 are illustrated as standalone systems that are external to condition monitoring system 140, it is contemplated that one or both of torque estimator 150 and performance simulator 160 may be included as a subsystem of condition monitoring system 140.

Torque estimator 150 may include a hardware or software module configured to receive/collect certain performance data from condition monitoring system 140 and determine, based on the received operation data, a drive axle torque associated with one or more machines 120a, 120b. Torque estimator 150 may be configured to determine a drive axle torque based on performance data collected by torque sensor 121a. Alternatively or additionally, drive axle torque may be estimated based on the performance data and the known design parameters of the machine. For example, based on an engine operating speed and the operating gear, torque estimator 150 may access an electronic look-up table and estimate the drive axle torque of the machine at a particular payload weight using the look-up table.

Once an estimated machine drive axle torque is determined, torque estimator 150 may estimate a total effective grade for the one or more machines. For example, torque estimator 150 may estimate a total effective grade (TEG) value as:

$$TEG = \frac{RP}{GMW} - \frac{MA}{AG}$$

where RP refers to machine rimpull, GMW refers to gross machine weight, MA refers to the acceleration of the machine, and AG refers to the actual grade of the terrain on which that machine is located. Gross machine weight and machine acceleration may be monitored using on-board data monitoring devices 121. Actual grade may be estimated based on monitored performance data. For example, actual grade may be determined using precision GPS data gathered from on-board GPS equipment. For example, performance data may include provide latitude, longitude, and elevation of the machine. The actual grade may be determined by calculating ratio between the vertical change in position (based on the elevation data associated with the GPS data) and the horizontal change in position (based on the latitude and longitude data associated with the GPS data). Alternatively or additionally, actual grade may be calculated using an on-board data monitoring device such as, for example, an inclinometer. Rim pull may be determined as:

$$RP = \frac{DAT \times LPTR \times PTE}{TDRR}$$

where DAT refers to the torque applied to the machine drive axle, LPTR refers to the lower power train reduction factor, PTE refers to the efficiency of the power train, and TDRR refers to the dynamic rolling radius of the tire. Lower power train reduction may be determined by monitoring a change in gear during real-time calculation of rim pull. Power train efficiency may be calculated based on real-time performance data collected from the machine. Tire dynamic rolling radius may be estimated based on a monitored tire pressure, speed, and gross machine weight.

Once total effective grade has been determined, torque estimator 150 may determine a rolling resistance associated with one or more of machines 120a, 120b. A rolling resistance value may be calculated as:

$$RR = TEG - (AG + EL)$$

where EL refers to the efficiency loss of the machine. Efficiency loss may be estimated as the difference between input power efficiency and output power efficiency, which may be estimated based on empirical test data at particular engine operating speeds and loading conditions. As explained, actual grade may be determined based on calculations associated with collected GPA data and/or monitored using an on-board inclinometer.

Performance simulator 160 may be configured to simulate performance of machines 120a, 120b under various operational or environmental conditions. Based on the simulation results, performance simulator 160 may determine operating conditions that achieve a desired performance of machines 120a, 120b and/or work environment 100. According to one embodiment, performance simulator 160 may be any type of computing system that includes component or machine simulating software. The simulating software may be configured to build an analytical model corresponding to a machine or any of its constituent components based on empirical data collected from real-time operations of the machine. Once the model is built, performance simulator 160 may analyze the model under specific operating conditions (e.g., load conditions, environmental conditions, terrain conditions, etc.) and generate simulated performance data of the machine based on the specified conditions.

According to one embodiment, performance simulator 160 may include ideal design models associated with each of machines 120a, 120b. These ideal models can be electronically simulated to generate ideal performance data (i.e., data based on ideal performance of machine and its constituent components). Those skilled in the art will recognize that, as a machine ages, components associated with the machine may begin to exhibit non-ideal behavior, due to normal wear, stress, and/or damage to the machine during operation. In order to provide more realistic performance simulations consistent with these non-idealities, the ideal models may be edited based on actual performance data collected from machines 120a, 120b, thereby creating actual or empirical models of a respective machine and/or its individual components.

Performance simulator 160 may be configured to identify a slow or underperforming truck. For example, performance simulator 160 may compare a total effective grade associated with each of machines 120a, 120b with a threshold total effective grade. The threshold total effective grade may be defined by a user or manufacturer and may be derived from total effective data gathered from operations of healthy, normal machines on the haul route obtained during one or more test runs of the route. If the actual total effective grade of a machine exceeds the threshold total effective grade value, performance simulator 160 may identify the machine as a slow or underperforming machine.

In another example, performance simulator 160 may identify slow or underperforming machines by simulating a performance-based model corresponding each of the machines using a target total effective grade value that is derived from performance data from a normal, healthy test machine. Simulated performance data may be compared with target performance data from the normal machine. If one or more simulated performance parameters are inconsistent with, or outside a target threshold range of, the corresponding target parameter, performance simulator 160 may identify the machine as slow or underperforming. For example, if data associated with simulations of the performance-based model using the target total effective grade value indicate that the haul route completion time is outside an acceptable limit, the machine may be identified as underperforming. The creation and derivation of performance based models mill be discuss in greater detail below.

Performance simulator 160 may simulate the actual models to predict performance and productivity of the machine under a variety of operating conditions. For example, performance simulator 160 may simulate an actual model of hauler 120b under a multiple payload and/or haul route conditions to determine a speed, torque output, engine condition, fuel consumption rate, haul route completion time, etc. associated with each simulated condition. In one embodiment, performance simulator 160 may be configured to select a payload level for the machine to meet a desired operating condition of the haul route or work environment 100. For example, a user of performance simulator 160 may specify a desired speed of the machine required to maintain a productivity requirement of the haul route. Performance simulator 160 may simulate operation of the machine at multiple payload levels and estimate the desired speed of the machine at each payload level. Performance simulator 160 may select the payload level that allows the machine to meet the user-specified speed requirements.

In another example, a user of performance simulator 160 may specify a fuel consumption limit for the machine. Performance simulator 160 may simulate an operation of the machine under multiple load conditions and identify one or more payload levels that, if selected, allow the machine to operate within the fuel consumption limitations specified by the user.

Performance simulator 160 may also include a diagnostic and/or prognostic simulation tool that simulates actual machine models (i.e., models derived or created from actual machine data) to predict a component failure and/or estimate the remaining lifespan of a particular component or subsystem of the machine. For example, based on performance data associated with the engine and/or transmission, performance simulator 160 may predict the remaining lifespan of the engine, drive train, differential, or other components or subsystems of the machine. Accordingly, performance simulator 160 may predict how changes in a payload profile for a machine may affect the lifespan of one or more of these components. For instance, performance simulator 160 may estimate that, if payload for a particular hauler 120b is reduced by 10%, the remaining lifespan of the drive train may increase by 15%. Performance simulator 160 may periodically report this data to a mine operator, project manager, machine operator, and/or maintenance department of work environment 100.

Performance simulator 160 may be configured to generate payload requirements 165 for one or more vehicles operating in work environment 100. According to one embodiment, payload requirements 165 may include loading limits for one or more machines 120a, 120b that increase or enhance performance of the one or more machines 120a, 120b and/or work environment 100. For example, performance simulator 160 may identify an underperforming or slow machine and determine, based on the performance data associated with the machine, a particular payload limit for the machine that enables the machine to maintain a desired speed. Performance simulator 160 may generate payload requirements 165 for the machine that specify the payload limits of the machine required to maintain a desired machine speed.

Payload requirements 165 may include paper-based or electronic reports that list machines whose payload levels are modified or prescribed to be lower than a maximum payload level for the machine. Thus, payload requirements 165 may be associated with any machine that performance simulator

160 prescribes to be loaded at less than a maximum loading level associated with the machine. According to one embodiment, payload requirements 165 may be delivered electronically (using email, text message, facsimile, etc.) or via any other appropriate format.

Performance simulator 160 may provide payload requirements 165 to one or more designated subscribers 170 of payload requirement data. Subscribers 170 may include, for example, operators of one or more transport machines 120b listed in the payload requirements 165, operators of one or more machines (e.g., automatic loading machines (conveyor belts, buckets, etc.), excavators 120a, etc.) responsible for loading transport machines 120b, project managers, mine owners, repair technicians, shift managers, human resource personnel, or any other person or entity that may be designated to receive payload requirements 165.

In addition to identifying slow or underperforming machines and specifying payload requirements for these machines that enable them to keep pace with faster, more efficient machines, performance simulator 160 may also include haul route design software that identifies potential problems with the haul route, based on the performance of a plurality machines 120a, 120b operating on the haul route. For example, design software associated with performance simulator 160 may be configured to identify patterns or trends in the performance data associated with segments of the haul route and determine, based on these trends, whether a haul route performance or productivity problem is a result of machine underperformance or a specific haul route condition (e.g., grade or slope of the haul route, condition of the haul route surface, distance of the haul route, etc.)

By way of example, performance simulator 160 may be configured to calculate an average total effective grade of a plurality of machines, based on the total effective grade data for each machine. If the average total effective grade exceeds a threshold level, performance simulator 160 may provide an indication of a potential problem associated with the haul route. If, on the other hand, the average total effective grade is below the threshold level, performance simulator 160 may determine that the condition of the haul route is acceptable. It is contemplated that the haul route analysis may be performed for individual segments of the haul route, to identify problematic portions of the haul route.

Performance simulator 160 may also be configured to identify potential problems with a haul route based on the number of machines that experience a particular performance deficiency. For example, performance simulator 160 may detect that 15 of 18 machines operating on a particular portion of the haul route are exhibiting an elevated value for total effective grade, indicating that these machines are slow or underperforming machine or, alternatively, that there may be a problem with the corresponding portion of the haul route. According to one embodiment, performance simulator 160 may be programmed to flag or identify potential haul route problems when the number of machines exhibiting a particular condition or behavior exceeds a threshold number or percentage of the total number of machines.

Performance simulator 160 may also be configured to receive haul route performance criteria 175 from a customer or subscriber, such as subscriber 170. Haul route performance criteria, as the term is used herein, refers to one or more features or parameters associated with the haul route that may be used to define and evaluate performance of the haul route. Non-limiting examples of performance criteria may include, for example, a greenhouse gas limit or target level associated with one or more of the machines, a maximum or minimum speed associated with the haul route or a portion thereof, a productivity or payload quota associated with one or more machines, a fuel consumption limit associated with the haul route or machines associated therewith, and/or a component lifespan associated with one or more machines.

According to one embodiment, subscribers 170 may specify specific performance levels or threshold limits associated with one or more performance criteria. For example, subscribers that operate in jurisdictions that impose strict limits on greenhouse gas emissions may desire to limit the amount of greenhouse gas emitted from each machine to a particular level. As such, subscriber 170 may specify an emission limit for the haul route. According to another example, subscribers desiring to increase performance and productivity of the haul route may specify a minimum speed for the haul route, requiring machines 120a, 120b to operate more quickly.

Performance simulator 160 may be configured to provide performance reports 167 that summarize deficiencies associated with the haul route and/or machines operating therein and providing recommendations for reducing the impact on these deficiencies on the haul route performance. For instance, if an average total effective grade associated with the fleet of machines becomes excessive for a particular haul route segment, performance simulator may provide a performance report summarizing a potential problem with the haul route. This report may contain different options for reducing total effective grade such as, for example, by limiting operational characteristics of the machines (e.g., payload levels, speed, etc.), by repairing or redesigning deficient haul route segments, or a combination of the two. Performance report 167 may also include short and long-term cost estimates associated with each option, as well as potential effects on component life estimates and productivity.

It is contemplated that one or more of condition monitoring system 140, torque estimator 150, and/or performance simulator 160 may be included as a single, integrated software package or hardware system. Alternatively or additionally, these systems may embody separate standalone modules configured to interact or cooperate to facilitate operation of one or more of the other systems. For example, while torque estimator 150 is illustrated and described as a standalone system, separate from performance simulator 160, it is contemplated that torque estimator 150 may be included as a software module configured to operate on the same computer system as performance simulator 160.

Figure 3:
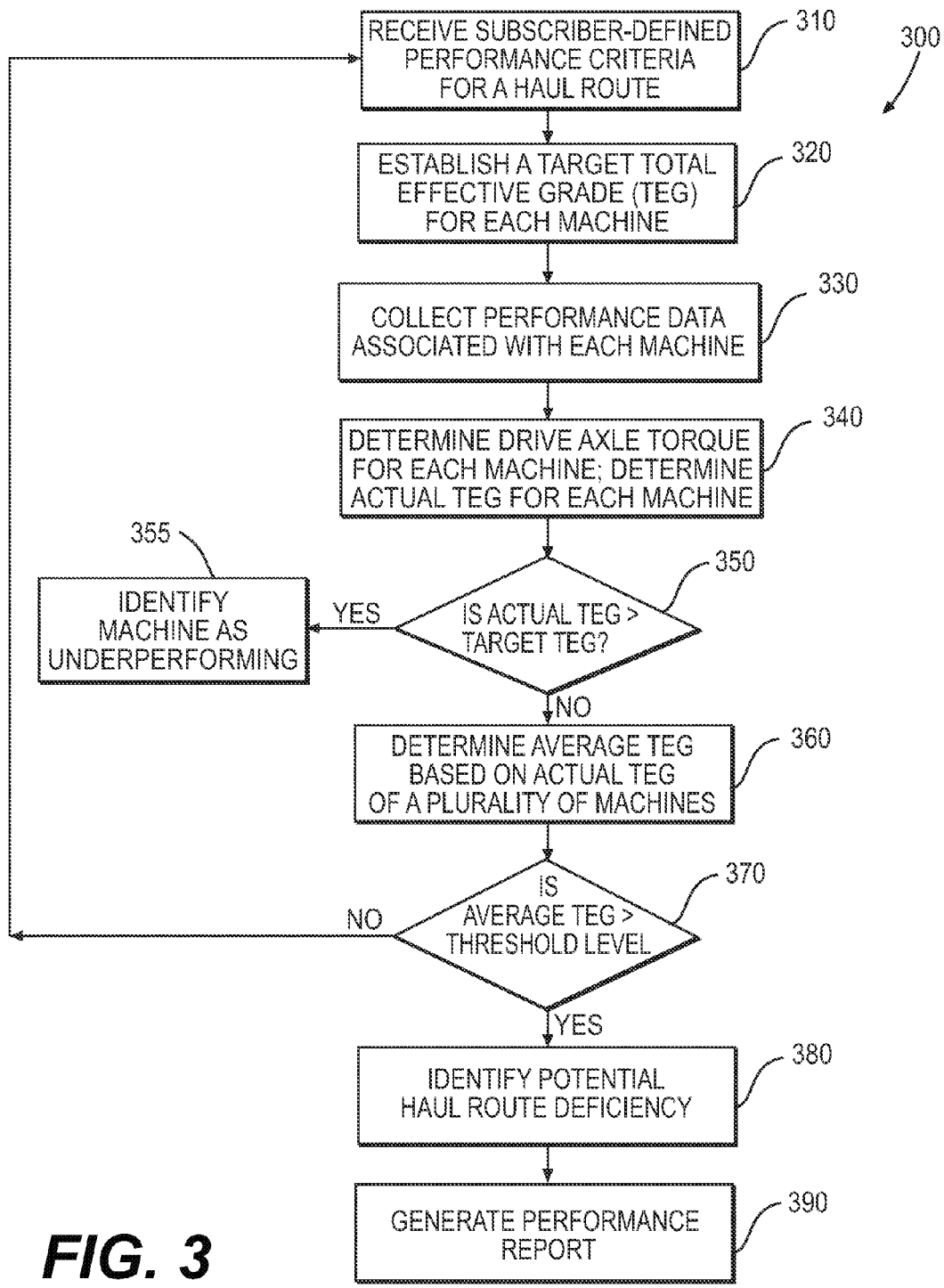
FIG. 3 provides a flowchart depicting one exemplary method for managing haul routes in work environments, consistent with certain disclosed embodiments.
Figure 4:
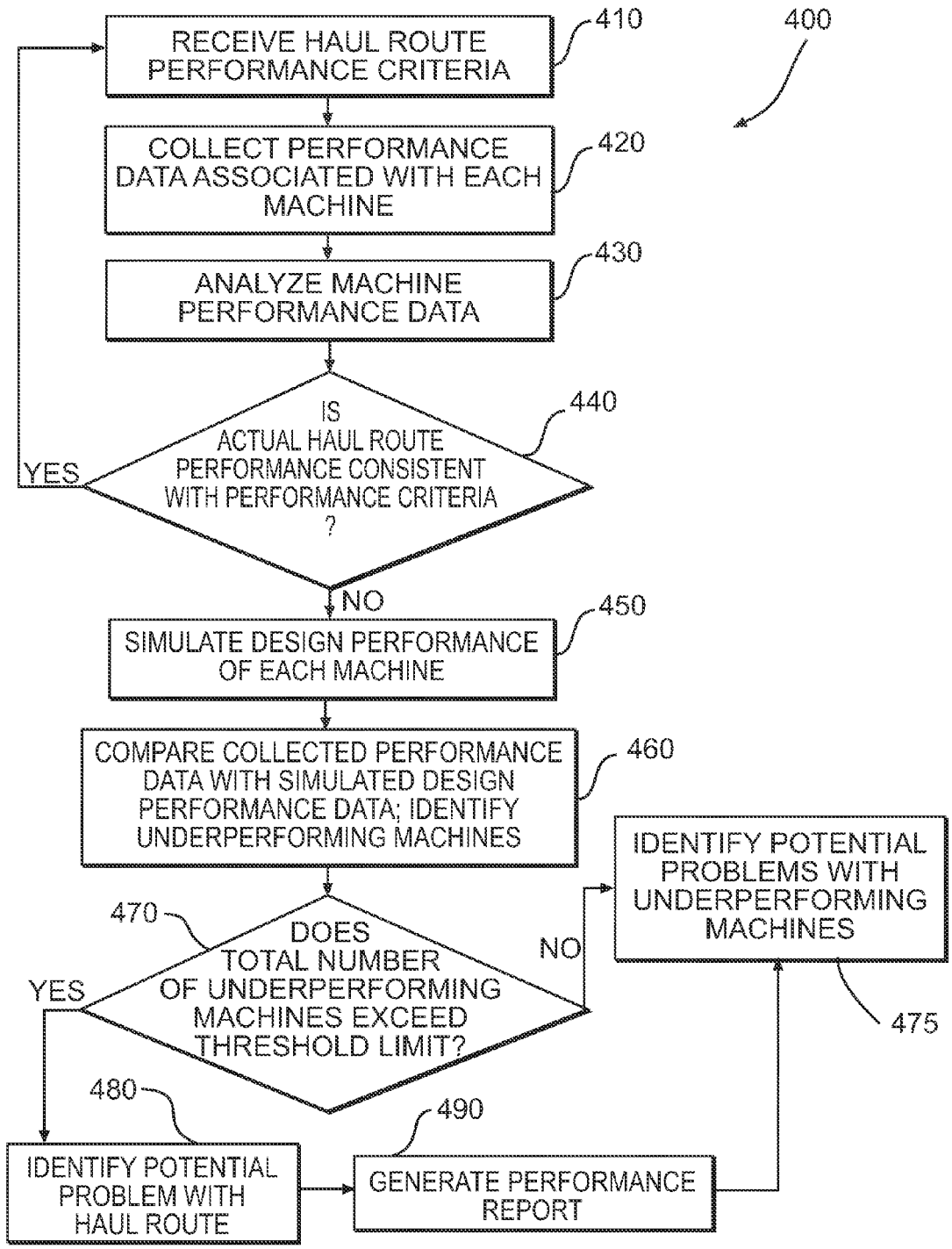
FIG. 4 provides a flowchart depicting another exemplary method for managing haul routes in work environments, consistent with certain disclosed embodiments.

Processes and methods consistent with the disclosed embodiments may enable modification of a haul route based on real-time performance of one or more machines 120a, 120b operating in work environment 100 by providing a system that combines real-time data monitoring and collection capabilities with haul route and machine performance analysis and simulation tools. Specifically, the features and methods described herein allow project managers, equipment owners, and/or mine operators to effectively improve haul route performance conditions by determining a plurality of options for enhancing performance and/or reducing costs associated with haul route management. Additionally, the methods described herein allow subscribers to specify certain haul route performance criteria, establish haul route evaluation parameters, based on the user-specified criteria, identify potential haul route deficiencies based on machine performance, and generate reports that summarize the potential deficiencies and provide recommendations for improving haul route performance. FIGS. 3 and 4 provide flowcharts 300 and 400, respectively, which illustrate exemplary methods for improving haul route management processes.

FIG. 3 provides a flowchart 300 depicting an exemplary disclosed method improving haul route management processes based on the performance of one or more machines operating on a haul route. The method may include receiving subscriber-defined performance criteria associated with the haul route (Step 310). As explained, subscriber-defined performance criteria may include certain limits or threshold levels associated with one or more performance parameters associated with the haul route. For example, subscriber-defined performance parameters may include daily greenhouse gas emission limit associated with one or more machines and/or the haul route. Alternatively or additionally, performance criteria may include a fuel consumption limit associated with one or more of the machines operating in the haul route. According to yet another example, performance criteria may include a productivity quota for each machine operating on the haul route. This productivity quota may be established based on an overall productivity goal associated with the machine and/or the work environment. In accordance with yet another example, performance criteria may include a speed associated with the haul route to effectuate a desired productivity for the machine or to maintain a particular target efficiency level associated with the route.

A target total effective grade for each machine may be established based on the subscriber-defined performance criteria (Step 320). For example, based on a subscriber-defined greenhouse gas limit, performance simulator 160 or software associated therewith may simulate a design model of a machine to estimate a target total effective grade for the machine. Performance simulator 160 may then determine a plurality of operating conditions (e.g., payload requirements, speed requirements, etc.) for the machine that effectuate the target total effective grade. These operating parameters may be provided to the machine operator, dispatcher, shift manager, and/or any other person responsible ensuring target operation of the machine.

During operation of one or more machine on the haul route, haul route management system 135 and/or condition monitoring system 140 associated therewith may collect performance data associated with each machine (Step 330). Once performance data has been received, a drive axle torque of the machine may be determined based on the performance data (Step 340). For example, torque estimator 150 may determine the drive axle torque based on data received from torque sensor 121a. Alternatively, torque estimator 150 may determine drive axle torque using electronic look-up tables (compiled from empirical test data associated with the type and model of machine) based on engine operating conditions, gear selection, and other data received from the machine.

Once drive axle torque has been determined/estimated, torque estimator 150 may calculate/estimate a total effective grade associated with each machine and determine if the calculated/estimated total effective grade is greater than the target total effective grade (Step 350). If the calculated total effective grade of the machine is less than or equal to the threshold value (Step 350: No) (which may indicate that the machine is operating normally), the process may proceed to Step 360). If, on the other hand, the calculated total effective grade is greater than the threshold value (Step 350: Yes), performance simulator may identify the machine as an underperforming machine (Step 355).

It should be noted, however, that, in certain situations, problems or deficiencies of the haul route may cause an abnormal increase in the total effective grade for a normal, healthy machine, making it appear as though it is underperforming. To detect problems or deficiencies of the haul route, performance simulator 160 may determine an average total effective grade as a function of the calculated total effective grade associated with a plurality of machines (Step 360). If the average total effective grade for the fleet of machines does not exceed a threshold level (Step 370: No) (indicating that the haul route condition has not likely deteriorated to a level that has a significant impact on the performance of a majority of the machines), performance simulator 106 may notify subscriber 170 of any machines previously identified as underperforming.

In contrast, if the average total effective grade for the fleet of machines exceeds the threshold level (Step 370: Yes) (indicating a potential problem with the haul route), performance simulator 160 may identify a potential haul route deficiency (Step 380). According to one embodiment, performance simulator 160 may divide haul route into a plurality of segments. Accordingly, performance simulator 160 may separately calculate and monitor average total effective grade for the fleet of machines for each segment. Performance simulator 160 may compare the average total effective grade for the fleet to a threshold (e.g., design) level for the particular segment. If the average total effective grade for the segment exceeds the threshold level, the segment may be identified as comprising a potential deficiency, and flagged for further investigation or inspection.

Performance simulator 160 may be configured to generate a performance report 167 associated with performance of the haul route and/or machines associated therewith (Step 390). Performance report 167 may provide a summary of operations associated with the haul route for a particular period of time (e.g., a work shift or haul route cycle). For example, performance report 167 may list each haul route segment and provide performance data for each machine operating on the particular haul route segment. Performance report 167 may also list fleet averages for particular performance parameters corresponding to the subscriber-defined performance criteria. Performance report 167 may also list underperforming machines and haul route segments that have been identified as potentially deficient.

Additionally, performance report 167 may provide certain recommendations for meeting the subscriber-defined performance criteria for one or more underperforming machines and/or haul route segments that have been identified as potentially deficient. These recommendations may include multiple options for improving haul route performance, as well as cost/benefit estimates associated with each option. For example, if the average total effective grade for a particular haul route exceeds the threshold level by a relatively nominal amount (indicating a potentially minor haul route deficiency), performance report 167 may provide a cost estimate associated with repairing the deficiency, thereby reducing the total effective grade average of the fleet traversing haul route segment.

Alternatively or additionally, performance report 167 may also include cost estimates associated with adjusting certain machine operating parameters (e.g., reducing the speed of the machines over the haul route segment, reducing the payload levels for each machine, etc.) that will also reduce the strain on the machines to reduce the total effective grade average of the fleet over haul route.

According to yet another example, performance report 167 may also include cost estimates with taking no action. This cost estimate may include costs associated with potential long-term impact(s) on the machine, such as component replacement costs due to decreased component lifespan, repair costs associated with increased maintenance requirements, speculative costs associated with potential safety risks (e.g., insurance premiums, environmental or safety compliance fines, etc.)

Systems and methods described herein provide a system that identifies performance deficiencies associated with haul routes and/or one or more machines and provides organizations with a plurality of haul route improvement options and estimates associated with implementing these options. Furthermore, processes and features consistent with the disclosed embodiments allow subscribers to establish customized performance criteria based on desired haul route performance goals. Accordingly, haul route and/or machine performance evaluations may be varied to ensure that customer-defined performance criteria are met. FIG. 4 provides a flowchart 400 illustrating another exemplary method for improving haul route management process based on subscriber-defined route performance criteria.

The haul route management process may commence upon receipt of haul route performance criteria from a subscriber (Step 410). The performance criteria may be input into performance simulator 160 and may be used to establish performance evaluation criteria (e.g., threshold levels) for the haul route and/or machines associated therewith. For example, subscribers desiring to reduce greenhouse gas emission levels associated with a haul route to conform to environmental regulations in a particular jurisdiction may specify performance criteria to limit the total greenhouse gas emission levels for the fleet of machines associated with the work environment.

Once haul route performance criteria has been received and input into performance simulator 160, performance data associated with each machine may be collected (Step 420). For example, condition monitoring system 140 of haul route management system 135 may receive/collect performance data from each machine operating in work environment 100. According to one embodiment, condition monitoring system 140 may automatically receive this data from data collectors 125 associated with each of machines 120a, 120b. Alternatively or additionally, condition monitoring system 140 may provide a data request to each of machines 120a, 120b and receive performance data from each machine in response to the request.

Haul route management system 135 and/or systems associated therewith may analyze the collected machine performance data (Step 430) and determine whether the actual haul route performance is consistent with the subscriber-defined performance criteria (Step 440). The determination as to whether the actual haul route performance is consistent with the performance criteria depends on how the performance criteria are established within performance simulator 160. For example, performance criteria 175 may specify a threshold limit for a particular parameter. Accordingly, only a monitored parameter that exceeds the threshold limit would constitute inconsistency. In some cases, however, subscribers may specify an acceptable threshold range. Thus, only monitored parameters that lie outside of the threshold range would be identified as inconsistent. Following the example above, performance simulator may monitor the greenhouse gas emission levels for each machine and calculate a total greenhouse gas emission level for the work environment. Performance simulator 160 may compare the greenhouse gas emission level of the fleet with the threshold limit to determine if the greenhouse gas emission level conforms to the subscriber-defined performance criteria.

If the actual haul route performance is consistent with the performance criteria (Step 440: Yes), the process proceeds to Step 410 and haul route management system 135 may continue monitoring machine performance. If, on the other hand, actual haul route performance is inconsistent with the performance criteria (Step 440: No), performance simulator 160 may simulate an ideal or design performance for each machine (Step 450). The actual performance data associated with each machine may be compared with the simulated design performance data and, if the actual performance data for the machine is inconsistent with the design performance, the machine may be identified as an underperforming machine (Step 460).

Following the example above, if the greenhouse gas emission limit associated with the haul route exceeds the subscriber-defined limit, performance simulator 160 may simulate a design model of one or more types of machines to determine an ideal greenhouse gas emission level for each machine. The actual emission data for each machine may then be compared with the design emission level for the machine. If the emission level for the machine is inconsistent with the design emission level, performance simulator may identify the machine as underperforming.

Once underperforming machines have been identified, performance simulator 160 may compare the number of underperforming machines with a threshold number to identify trends in haul route conditions (Step 470). If the number of underperforming machines exceeds a threshold number (Step 470: Yes) (which may be indicative of potentially problematic haul route conditions) performance simulator 160 may identify potential problems with one or more portions of the haul route (Step 480). For example, if a particular segment of the haul route identifies 15 of 18 machines as underperforming, performance simulator 160 may flag this portion of the haul for further analysis.

If, on the other hand, the number of underperforming machines does not exceed a threshold limit (Step 470: No) (which may indicate that an underperforming machine's deficient performance is likely caused by a problem with the machine itself rather than the haul route), performance simulator 160 may identify potential problems with machine based on the actual performance data (Step 475).

Performance simulator 160 may be configured to generate a performance report 167 associated with performance of the haul route and/or machines associated therewith (Step 490). As noted above, performance report 167 may provide a summary of operations associated with the haul route for a particular period of time (e.g., a work shift or haul route cycle). For example, performance report may list each haul route segment and provide performance data for each machine operating on the particular haul route segment. Performance report 167 may also list fleet averages for particular performance parameters corresponding to the subscriber-defined performance criteria. Performance report 167 may also list underperforming machines and haul route segments that have been identified as potentially deficient.

INDUSTRIAL APPLICABILITY

Methods and systems consistent with the disclosed embodiments may provide a haul route management solution that integrates real-time equipment monitoring systems and performance-based analysis and simulation tools to adjust haul route management processes to achieve or maintain a performance and/or productivity level associated with work environment 100. Work environments that employ processes and features described herein provide an automated system for detecting haul route performance deficiencies based on subscriber-defined performance criteria and providing multiple options for correcting these deficiencies.

Although the disclosed embodiments are described in connection with work environments involving haul routes for mining equipment, they may be applicable to any work environment where it may be advantageous to identify haul route performance deficiencies that have a negative impact on the productivity and/or environmental compliance of a fleet of machines. According to one embodiment, the presently disclosed haul route management system and associated methods may be implemented as part of a connected worksite environment that monitors performance data associated with a machine fleet and diagnoses potential problems with haul route conditions and/or machines operating in the haul route. As such, the haul route management system may enable both health and productivity monitoring of a work environment using real-time performance data associated with the one or more machines.

The presently disclosed haul route management system and associated methods may have several advantages. For example, the haul route management system described herein is configured to receive subscriber-based performance criteria and customize performance analysis based on these criteria. As a result, the presently disclosed system allows organizations to evaluate various haul route management scenarios in order to focus haul route analysis to more appropriately effectuate their goals. In contrast, conventional systems that do not allow users to customize performance evaluation parameters may not be able to effectively manage the haul route to achieve performance goals.

It will be apparent to those skilled in the art that various modifications and variations can be made to the disclosed systems and methods for improving haul route management without departing from the scope of the invention. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A haul route management system, comprising:
   a condition monitoring system in data communication with at least one machine operating in a work environment and configured to collect performance data associated with the at least one machine;
   a torque estimator communicatively coupled to the condition monitoring system and configured to determine a drive axle torque of the at least one machine and estimate a total effective grade associated with the at least one machine based on the drive axle torque;
   a performance simulator communicatively coupled to the torque estimator and the condition monitoring system, wherein the performance simulator is configured to:
   establish a target total effective grade for the at least one machine based on the performance criteria;
   collect performance data associated with the at least one machine;
   monitor an average total effective grade for the at least one machine, wherein the average total effective grade is calculated as a function of the actual total effective grade for the at least one machine; and
   identify a potential haul route deficiency if the average total effective grade exceeds a threshold level.

2. The system of claim 1, wherein the performance simulator is further configured to generate a performance report that provides recommendations for resolving the potential haul route deficiency.

3. The system of claim 1, wherein the performance simulator is further configured to identify the at least one machine as an underperforming machine if the actual total effective grade for the at least one machine exceeds the target total effective grade.

4. The system of claim 3, wherein the performance simulator is further configured to generate a performance report that provides recommendations for improving performance of one or more underperforming machines.

5. The system of claim 1, wherein the performance criteria includes one or more of a greenhouse gas emission limit associated with the at least one machine, a speed associated with a portion of the haul route, a productivity quota, a fuel consumption level, or a lifespan associated with one or more components of the at least one machine.

* * * * *